US006805490B2

(12) United States Patent
Levola (10) Patent No.: US 6,805,490 B2
(45) Date of Patent: Oct. 19, 2004

(54) METHOD AND SYSTEM FOR BEAM EXPANSION IN A DISPLAY DEVICE

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 164 days.

(21) Appl. No.: 10/261,236

(22) Filed: Sep. 30, 2002

(65) Prior Publication Data

US 2004/0062502 A1 Apr. 1, 2004

(51) Int. Cl.[7] ................................................. G02B 6/38
(52) U.S. Cl. ............................ 385/67; 359/15; 359/19; 359/24; 359/16; 359/13
(58) Field of Search ............................. 359/15, 19, 24, 359/16, 13, 629, 634; 385/67, 147, 24, 37; 362/31, 328; 348/115

(56) References Cited

U.S. PATENT DOCUMENTS

| | | | |
|---|---|---|---|
| 4,309,070 A | 1/1982 | St. Leger Searle | 350/3.7 |
| 4,711,512 A | 12/1987 | Upatnieks | 350/3.7 |
| 4,946,253 A * | 8/1990 | Kostuck | 359/15 |
| 5,369,415 A | 11/1994 | Richard et al. | 345/6 |
| 5,724,163 A * | 3/1998 | David | 359/15 |
| 5,867,795 A | 2/1999 | Novis et al. | 455/566 |
| 5,880,888 A | 3/1999 | Schoenmakers et al. | 359/631 |
| 5,882,773 A | 3/1999 | Chow et al. | 428/212 |
| 5,966,223 A * | 10/1999 | Friesem et al. | 359/16 |
| 6,073,034 A | 6/2000 | Jacobsen et al. | 455/566 |
| 6,169,613 B1 | 1/2001 | Amitai et al. | 359/15 |
| 6,185,015 B1 * | 2/2001 | Reinhorn et al. | 359/15 |
| 6,243,056 B1 | 6/2001 | Jachimowicz et al. | 345/82 |
| 6,334,063 B1 | 12/2001 | Charlier et al. | 455/566 |
| 6,360,104 B1 | 3/2002 | Budd et al. | 455/550 |
| 6,424,843 B1 | 7/2002 | Reitmaa et al. | 455/566 |
| 6,580,529 B1 * | 6/2003 | Amitai et al. | 359/13 |
| 2001/0034250 A1 | 10/2001 | Chadha | 455/566 |
| 2002/0058531 A1 | 5/2002 | Terasaki et al. | 455/556 |

FOREIGN PATENT DOCUMENTS

| | | | |
|---|---|---|---|
| EP | 0 322 218 | 12/1988 | |
| EP | 0 535 402 | 9/1992 | |
| EP | 0 833 486 | 9/1996 | |
| JP | 4-354076 | 8/1992 | |
| JP | 7-235892 | 5/1995 | |
| WO | WO 96/35288 | 11/1996 | |
| WO | WO 98/21612 | 5/1998 | |
| WO | WO 99/44347 | 9/1999 | |
| WO | 9952002 | 10/1999 | ............ G02B/5/32 |
| WO | WO 01/09663 | 2/2001 | |
| WO | WO 01/88598 | 11/2001 | |
| WO | WO 01/95027 | 12/2001 | |

OTHER PUBLICATIONS

Optical Society of America; Y. Amitai et al; "Visor–display design Based on planar holographic optics", Applied Optics, vol. 34, No. 8, pp. 1352–1356;Mar. 10, 1995.

* cited by examiner

Primary Examiner—Sandra O'Shea
Assistant Examiner—Sumati Krishnan
(74) Attorney, Agent, or Firm—Ware, Fressola, Van Der Sluys & Adolphson LLP; Bradford Green (57) ABSTRACT

A planar substrate having a first diffractive element for coupling light waves of different colors into the substrate and guiding the light waves by successive internal reflections. A second diffractive element, disposed on the substrate, causes the guided light waves to be partially transmitted out of the substrate where the light waves encounter the second diffractive element. Because light waves of each color are reflected at different reflection angles, the light waves with smaller reflection angles encounter the second diffractive element at more locations than those with larger reflection angles, resulting in color non-uniformity in the light transmitted out from the substrate surface. One or more interfaces are provided between the surfaces of the substrate to selectively reflect the light waves having larger reflection angles toward the second diffraction element, so that light waves of different colors encounter the second diffraction element substantially at the same number of locations.

13 Claims, 12 Drawing Sheets

METHOD AND SYSTEM FOR BEAM EXPANSION IN A DISPLAY DEVICE

FIELD OF THE INVENTION

The present invention relates generally to a display to be used in a portable device and, more specifically, to a display that uses one or more diffractive elements for extending the exit pupil of the display for viewing.

BACKGROUND OF THE INVENTION

While it is a common practice to use a low-resolution liquid-crystal display (LCD) panel to display network information and text messages in a mobile device, it is preferred to use a high-resolution display to browse rich information content of text and images. A microdisplay-based system can provide full color pixels at 50–100 lines per mm. Such high-resolution is generally suitable for a virtual display. A virtual display typically consists of a microdisplay to provide an image and an optical arrangement for manipulating light emerging from the image in such a way that it is perceived as large as a direct view display panel. A virtual display can be monocular or binocular.

The size of the beam of light emerging from imaging optics toward the eye is called exit pupil. In a Near-Eye Display (NED), the exit pupil is typically of the order of 10 mm in diameter. Further enlarging the exit pupil makes using the virtual display significantly easier, because the device can be put at a distance from the eye. Thus, such a display no longer qualifies as a NED, for obvious reasons. Head-Up Displays are an example of the virtual display with a sufficiently large exit pupil.

Figure 1:
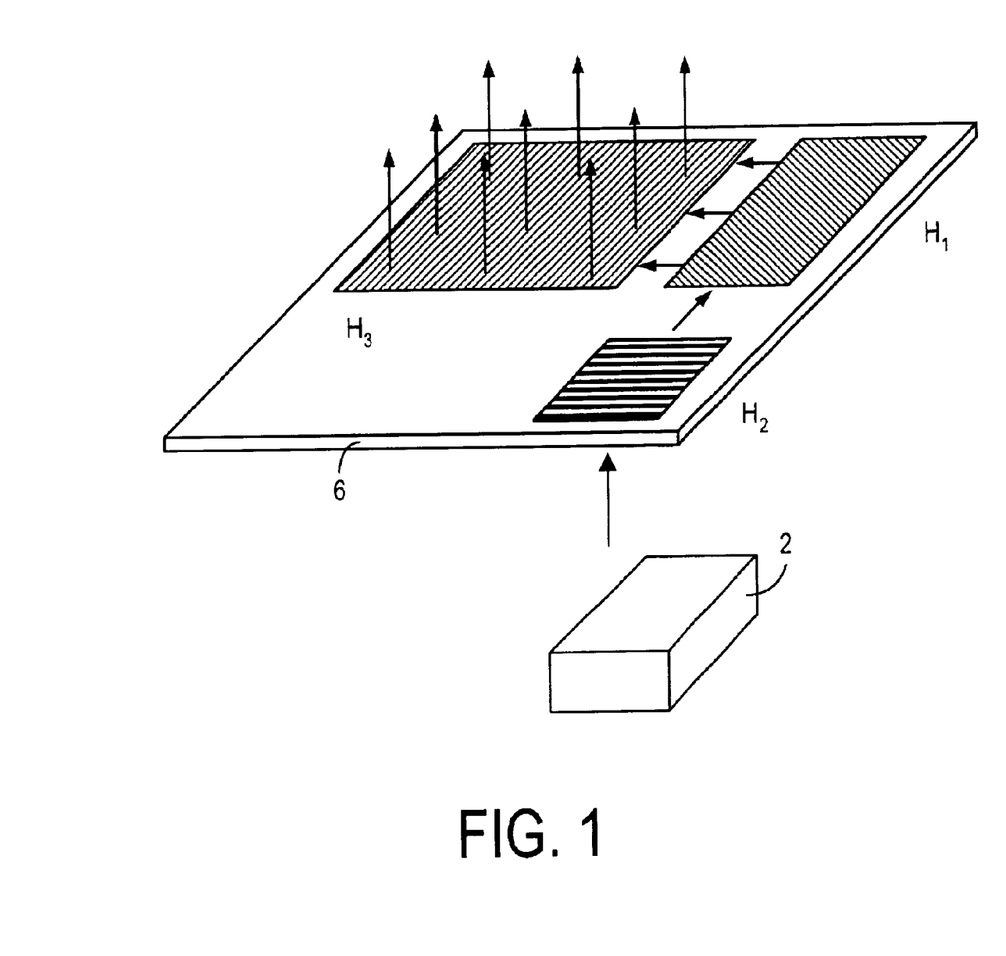
FIG. 1 is a schematic representation showing an exit pupil extender using three diffractive elements.

WO 99/52002 discloses a method of enlarging the exit pupil of a virtual display. The disclosed method uses three successive holographic optical elements (HOEs) to enlarge the exit pupil. In particular, the HOEs are diffractive grating elements arranged on a planar, light transmissive substrate 6, as shown in FIG. 1. As shown, light from an image source 2 is incident upon the first HOE, or H1, which is disposed on one side of the substrate 6. Light from H1, coupled into the substrate 6, is directed toward the second HOE, or H2, where the distribution of light is expanded in one direction. H2 also redirects the expanded light distribution to the third HOE, or H3, where the light distribution is further expanded in another direction. The holographic elements can be on any side of the substrate 6. H3 also redirects the expanded light distribution outward from the substrate surface on which H3 is disposed. The optical system, as shown in FIG. 1, operates as a beam-expanding device, which maintains the general direction of the light beam. Such a device is also referred to as an exit pupil extender (EPE).

Figure 2:
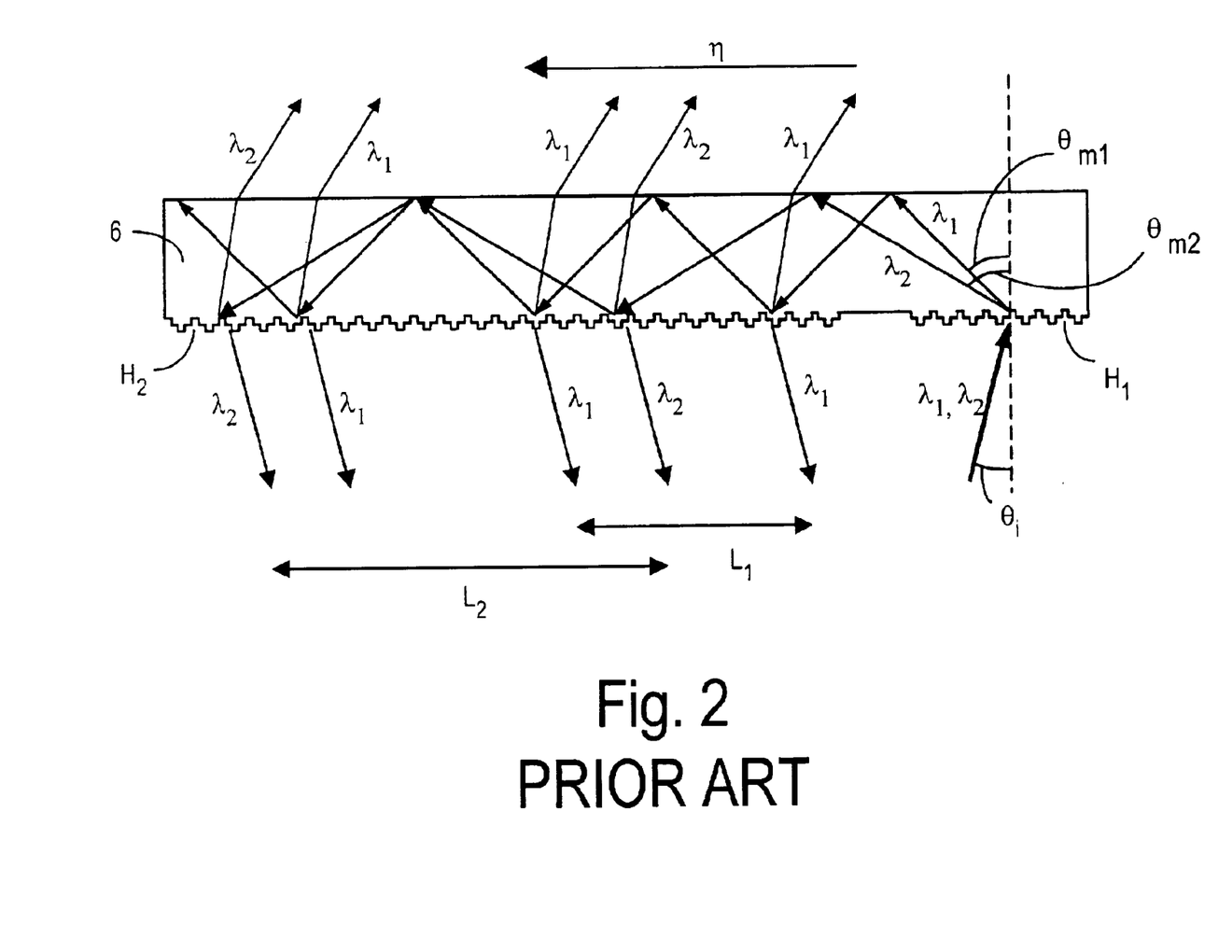
FIG. 2 is a schematic representation showing a prior art exit pupil extender.

The EPE, such as that shown in FIG. 1, results in color non-uniformity, thereby degrading the quality of the reproduced virtual image. The color non-uniformity is mainly due to the fact that light beams of different colors travel different paths in the substrate 6, as shown in FIG. 2. For illustration purposes, only two colors, represented by $\lambda_1$ and $\lambda_2$, are used to show the source of color non-uniformity in the prior art EPE, with $\lambda_1 < \lambda_2$.

In FIG. 2, only two HOEs are used, but the source of color non-uniformity is the same when three or more HOEs are used. The first HOE, or H1, typically has a diffractive structure consisting of parallel diffractive fringes for coupling incident light into the substrate 6 and directing the light distribution within the substrate 6 toward the second HOE, or H2. The substrate 6 acts as a light guide to trap the light beams between its two surfaces mainly by means of total internal reflection (TIR). As shown in FIG. 2, the diffractive elements H1 and H2 are both disposed on the lower surface of the substrate 6. In such an optical device, TIR is complete only at the upper surface, because part of the light is diffracted out from the lower surface of the substrate toward the viewer's eye.

It is known that the diffraction angle inside the substrate 6 is governed by:

$$\sin(\theta_i) - n\sin(\theta_m) = m\lambda/d \qquad (1)$$

where d is the grating period of the diffractive element (here H1)

$\lambda$ is the wavelength n is the refractive index of the substrate m is the diffraction order $\theta_i$ is the angle of incident, and $\theta_m$ is the angle of diffraction in $m^{th}$ order.

As can be seen from Equation 1, the diffraction angle $\theta_m$ increases with wavelength $\lambda$. Thus, the diffraction angle $\theta_{m1}$ is smaller than the diffraction angle $\theta_{m2}$. As a result, the interval L between two successive TIRs also varies with wavelength. The interval $L_1$ for $\lambda_1$ is smaller than the interval $L_2$ for $\lambda_2$. Thus, the distribution of outgoing light in the $\eta$ direction is not uniform for all wavelengths (see FIG. 6), although the grating structure can be designed so that the output is homogeneous for one wavelength (blue, for example; see FIG. 6). As can be seen in FIG. 2, the shorter wavelength $\lambda_1$ experiences more "hits" than and $\lambda 2$ on the diffractive elements H2. Consequently, more light of the shorter wavelength $\lambda_1$ "leaks" out of the diffractive element H2 in the area near H1. In a display where three primary colors (red, green, blue) are used, an EPE of FIG. 2 will cause an uneven color distribution of the light exiting the diffractive grating structure of H2. Thus, the color may appear bluish on the near end and reddish on the far end, relative to H1. As the distance along the $\eta$ direction increases, the uneven color distribution becomes more noticeable.

It should be noted that light can "leak" out of the substrate 6 from the lower surface where H2 is located or from the upper surface. The distribution of outgoing light from the upper surface is similar to that from the lower surface.

It is advantageous and desirable to provide a method and system for improving the color uniformity in light distribution in an exit pupil extender.

SUMMARY OF THE INVENTION

It is a primary objective of the present invention to reduce or eliminate the difference in the interval between successive total internal reflections for different wavelengths. This objective can be achieved by using a substrate with a plurality of layers so that the total internal reflection for one color occurs at a different layer surface.

Thus, according to the first aspect of the present invention, there is provided an optical device (10), which comprises:

a substantially planar light-guiding member (60) having a first surface (32) and an opposing second surface (52), and a light coupling structure (H1) positioned relative to the light-guiding member for coupling light waves (70) into the light-guiding member, the light-guiding member guiding the light waves (72, 74) within the light-guiding member based substantially on successive internal reflections as the light waves travel between the first and second surfaces, the light waves comprising at least first light waves of a first color ($\lambda_1$) and second light waves of a second different color ($\lambda_2$), wherein the first light waves are internally reflected at a first reflection angle ($\theta_{m1}$) and the second light waves are internally reflected at a second reflection angle ($\theta_{m2}$) greater than the first reflection angle in reference to a surface normal (N) of the second surface. The optical device is characterized by at least one substantially planar interface (40) provided between the first surface and the second surface substantially parallel to the first surface to reflect the second light waves toward the second surface as the second light waves travel from the second surface toward the first surface, while allowing the first light waves traveling from the second surface toward the first surface to be transmitted through the planar interface.

Preferably, when the successive internal reflections by the first light waves at the second surface occur at a plurality of first reflection points separated by a first reflection interval (L1), and the successive internal reflections by the second light waves at the second surface occur at a plurality of second reflection points separated by a second reflection interval (L2), the optical device is further characterized in that the planar interface is positioned between the first and second surfaces such that the first reflection interval is substantially equal to the second reflection interval.

Preferably, the optical device further comprises a further light coupling structure (H2) positioned relative to the light-guiding member to cause the light waves encountering the second surface to be partially transmitted through the second surface and partially reflected toward the first surface. The further light coupling structure (H2) is also capable of causing the light waves encountering the second surface to be partially transmitted through the planar interface (40) and then the first surface (32), and partially reflected from the second surface toward the first surface while maintaining the reflection angles.

Preferably, the light coupling structure (H1) and the further light coupling structure (H2) are holographic diffractive elements imparted on the light-guiding member.

Preferably, when the light waves further comprise third light waves of a third color ($\lambda_3$) different from the first and second colors, and the third light waves are internally reflected at a third reflection angle ($\theta_{m3}$) smaller than the first and the second reflection angles, the optical device is further characterized by
  a further planar interface (42) provided between the first surface (32) and the planar interface (40) so as to reflect the first light waves toward the second surface as the first light waves travel from the second surface toward the first surface, while allowing the third light waves traveling from the second surface toward the first surface to be transmitted through the further planar interface.

Preferably, when the light-guiding member is made of an optical material having a first refractive index, the planar interface (40) is a layer made of an optical material having a second refractive index smaller than the first refractive index so that the reflections by the second light waves at the planar interface are total internal reflections.

Preferably, the further planar interface (42) is a layer made of an optical material having a second refractive index smaller than the first refractive index so that the reflections by the first light waves at the further planar interface are total internal reflections.

According to the second aspect of the present invention, there is provided a method of improving color uniformity in an optical device (10), wherein the optical device comprises:
  a substantially planar light-guiding member (60) having a first surface (32) and an opposing second surface (52), and
  a light coupling structure (H1) positioned relative to the light-guiding member for coupling light waves (70) into the light-guiding member, the light-guiding member guiding the light waves (72, 74) within the light-guiding member based substantially on successive internal reflections as the light waves travel between the first and second surfaces, the light waves comprising at least first light waves of a first color ($\lambda_1$) and second light waves of a second different color ($\lambda_2$), wherein the first light waves are internally reflected at a first reflection angle ($\theta_{m1}$) and the second light waves are internally reflected at a second reflection angle ($\theta_{m2}$) greater than the first reflection angle in reference to a surface normal (N) of the second surface. The method is characterized by
  providing at least one substantially planar interface (40) between the first surface and the second surface substantially parallel to the first surface so as to reflect the second light waves toward the second surface as the second light waves travel from the second surface toward the first surface, while allowing the first light waves traveling from the second surface toward the first surface to be transmitted through the planar interface.

Preferably, when the successive internal reflections by the first light waves at the second surface occur at a plurality of first reflection points separated by a first reflection interval (L1), and the successive internal reflections by the second light waves at the second surface occur at a plurality of second reflection points separated by a second reflection interval (L2), the method is further characterized in that
  the planar interface is provided at a position between the first and second surfaces such that the first reflection interval is substantially equal to the second reflection interval.

According to the third aspect of the present invention, there is provided a substantially planar waveguide (60) having a first surface (32) and an opposing second surface (52), to be used with a first light coupling structure (H1) and a second light coupling structure (2), wherein
  the first light coupling structure is positioned relative to the planar waveguide for coupling light waves (70) into the planar waveguide, the planar waveguide guiding the light waves (72, 74) based substantially on successive internal reflections as the light waves travel between the first and second surfaces, the light waves comprising at least first light waves of a first color ($\lambda_1$) and second light waves of a second different color ($\lambda_2$), wherein the first light waves are internally reflected at a first reflection angle ($\theta_{m1}$) and the second light waves are internally reflected at a second reflection angle ($\theta_{m2}$) greater than the first reflection angle in reference to a surface normal (N) of the second surface, and
  the second light coupling structure (H2) is positioned relative to the planar waveguide to cause the light waves encountering the second surface to be partially transmitted through the second surface and partially reflected toward the first surface. The planar waveguide is characterized by
  at least one substantially planar interface (40) provided between the first surface and the second surface substantially parallel to the first surface to reflect the second light waves toward the second surface as the second light waves travel from the second surface toward the first surface, while allowing the first light waves traveling from the second surface toward the first surface to be transmitted through the planar interface.

Preferably, when the successive internal reflections by the first light waves at the second surface occur at a plurality of first reflection points separated by a first reflection interval (L1), and the successive internal reflections by the second light waves at the second surface occur at a plurality of second reflection interval (L2), the planar waveguide is further characterized in that the planar interface is positioned between the first and second surfaces such that the first reflection interval is substantially equal to the second reflection interval.

Preferably, when the light waves further comprise third light waves of a third color ($\lambda_3$) different from the first and second colors, and the third light waves are internally reflected at a third reflection angle ($\theta_{m3}$) smaller than the first and the second reflection angles. The planar waveguide is further characterized by a further planar interface (42) provided between the first surface (32) and the planar interface (40) so as to reflect the first light waves toward the second surface as the first light waves travel from the second surface toward the first surface, while allowing the third light waves traveling from the second surface toward the first surface to be transmitted through the further planar interface.

BEST MODE TO CARRY OUT THE INVENTION

Figure 3A:
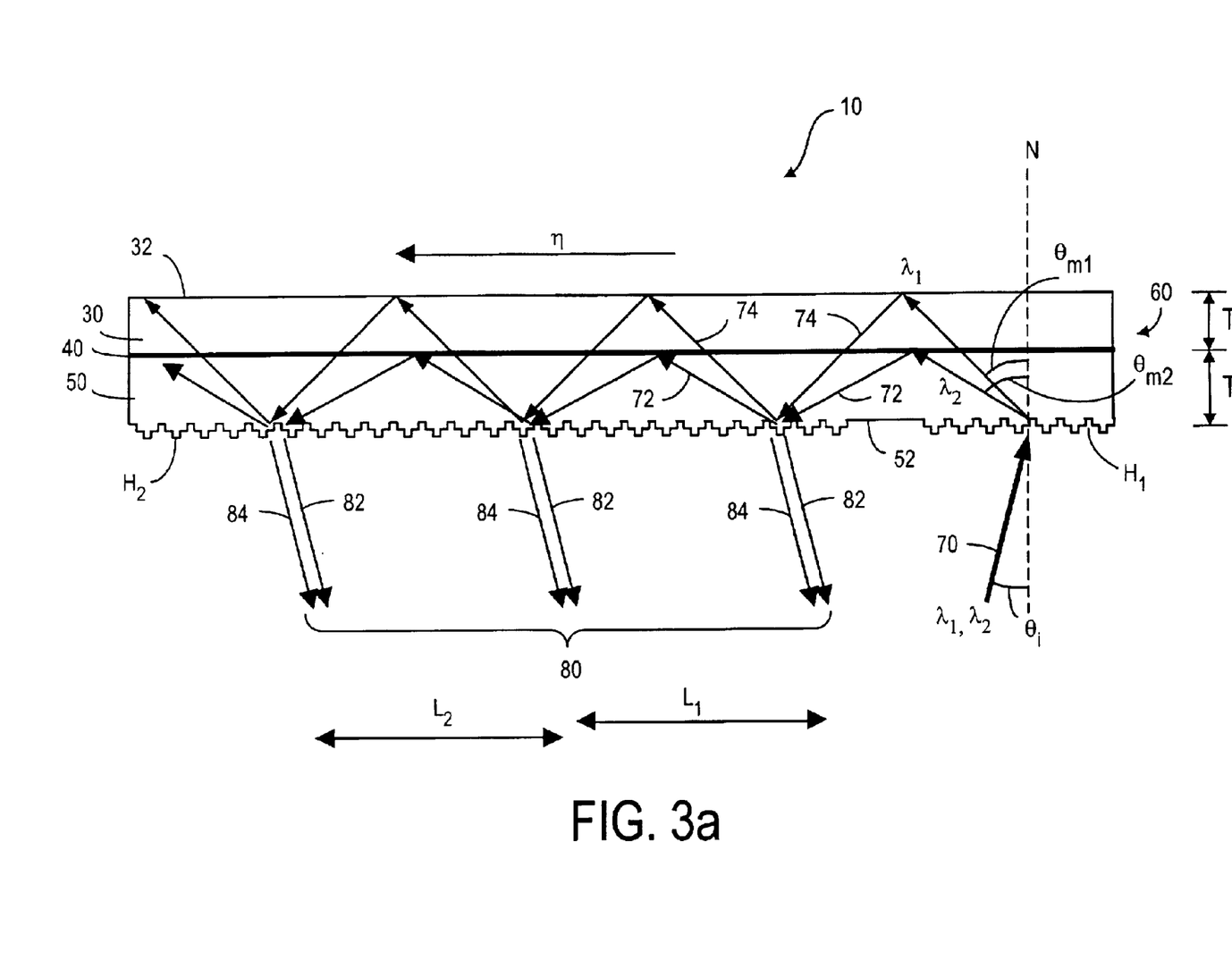
FIG. 3a is a schematic representation showing an exit pupil extender, according to the present invention, wherein outgoing light emerges from the lower surface of the substrate.
Figure 3B:
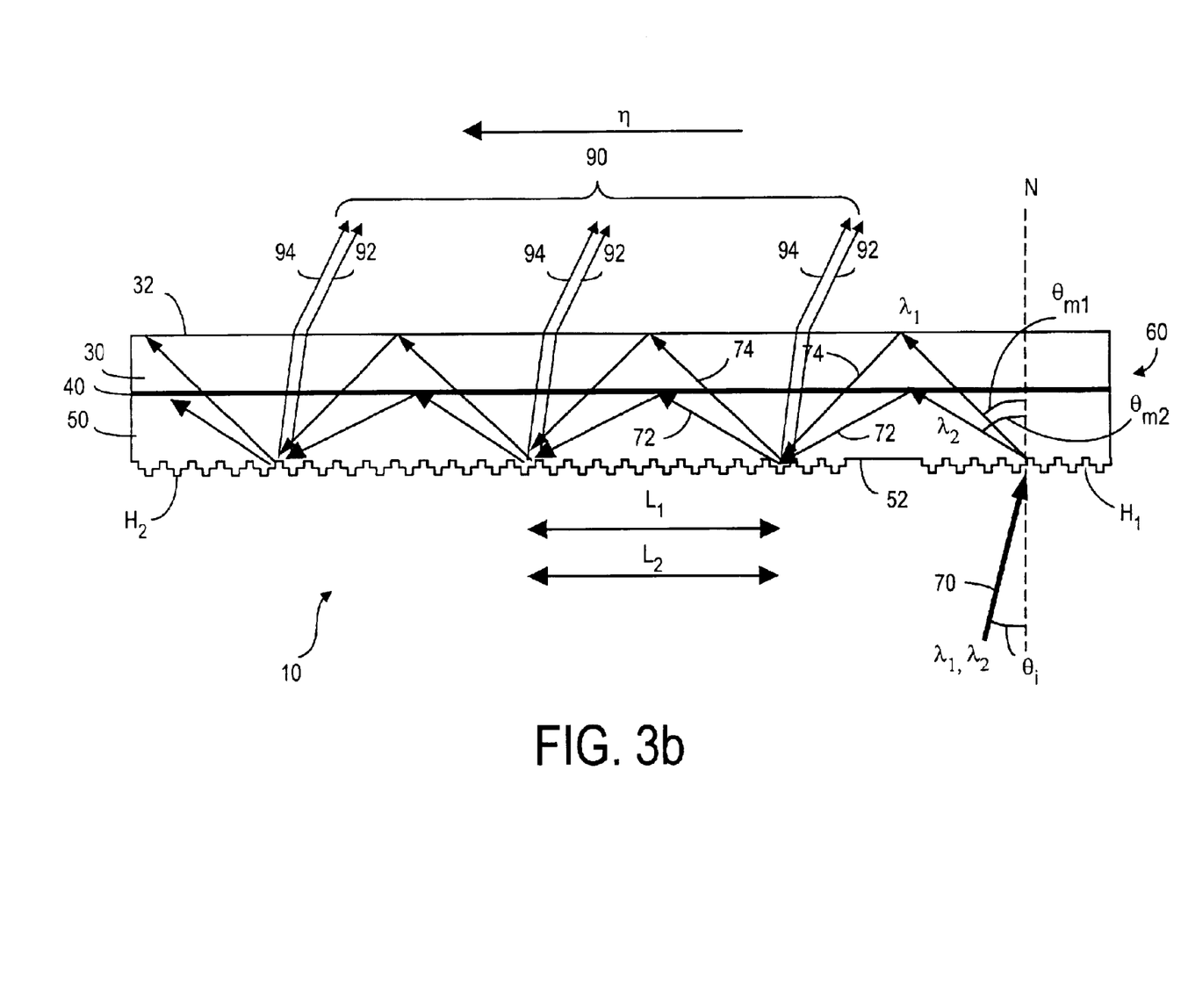
FIG. 3b is a schematic representation showing a similar exit pupil extender, wherein outgoing light emerges from the upper surface of the substrate.
Figure 3C:
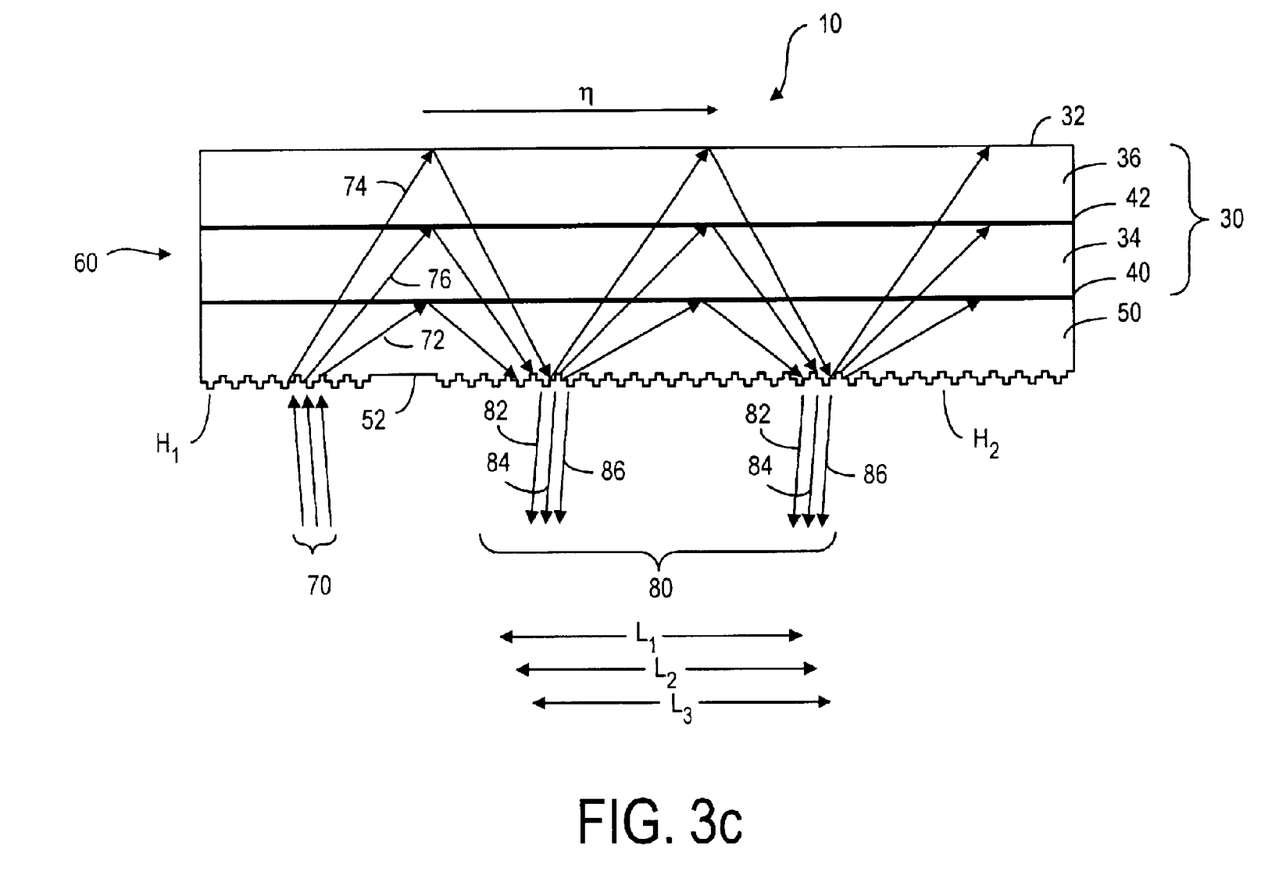
FIG. 3c is a schematic representation showing another exit pupil extender, according to the present invention.
Figure 3D:
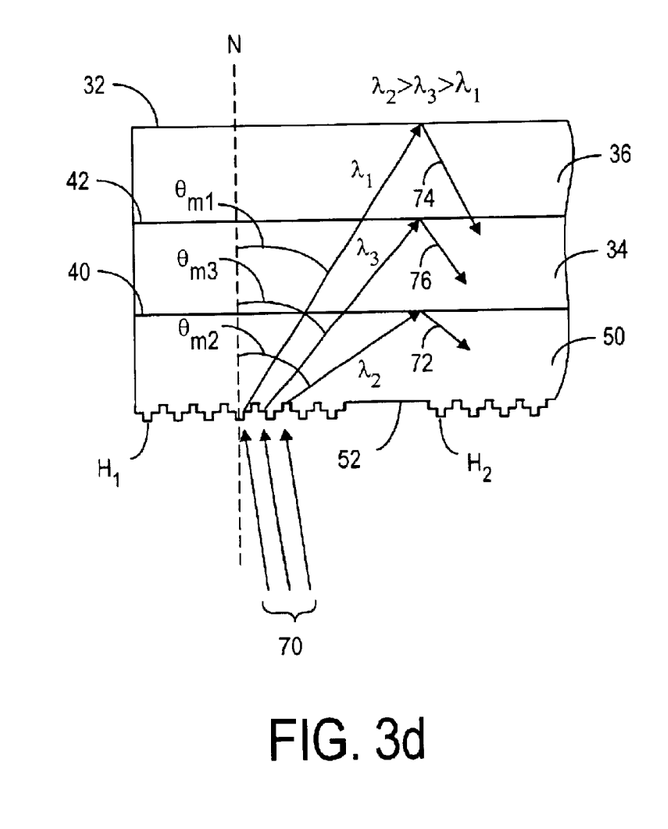
FIG. 3d is a schematic representation showing the detail of the exit pupil extender of FIG. 3c.

Instead of using a homogeneous substrate 6, as shown in FIG. 2, the exit pupil extender (EPE) 10, of the present invention, uses a substrate 60 consisting of a plurality of layers, as shown in FIGS. 3a to 3c.

As shown in FIG. 3a, the substrate 60 has a first layer 30 of optical material and a second layer 50 of optical material such that the total internal reflection (TIR) for the shorter wavelength $\lambda_1$ occurs at the air-substrate interface 32 while the TIR for the longer wavelength $\lambda_2$ occurs at the interface between the first layer 30 and the second layer 50. Preferably, a thin film 40 is provided between the first layer 30 and the second layer 50. For example, the thin film 40 is made of a material having a refractive index lower than the refractive index of the second layer 50. If the second layer 50 is made of glass or plastic, then the thin film 40 can be made of $AIF_3$, NaF, cryolite, etc., to separate red light ($\lambda_2$) from light of shorter wavelengths. The refractive index of these thin film materials is of the order of 1.35. As such, red light 72 is reflected at the interface between the thin film 40 and the second layer 50, while light of a shorter wavelength 74 can go through the thin film 40 and is reflected at the interface 32. In that case, the first layer 30 and the second layer 50 can be made of different optical materials or of the same optical material. The relative thickness of each layer is determined by the diffraction angles $\theta_{m1}$ and $\theta_{m2}$ corresponding different wavelengths $\lambda_1$ and $\lambda_2$ at a given incident angle $\theta_i$ of the incident light 70 at the first diffractive element H1. The diffraction angles $\theta_{m1}$ and $\theta_{m2}$, in reference to the surface normal N of the substrate 60, are the same as the internal reflection angels of the corresponding wavelengths within the substrate 60.

As shown in FIG. 3a, the interval L1 between successive TIR for $\lambda_1$ and the interval L2 for $\lambda_2$ can be made substantially the same by choosing the correct thickness of the layers 30, 50. If the diffraction angle $\theta_m$ for $\lambda_1$ is $\theta_1$ and that for $\lambda_2$ is $\theta_2$, and the thickness of the first layer 30 is T1 and the thickness of the second layer 50 is T2, then (T1+T2)/T2=tan $\theta_2$/tan $\theta_2$. Here, it is assumed that the refractive index for the layer 30 is the same as that for the layer 50. As such, the number of "hits" experienced by the shorter wavelength $\lambda_1$ is about the same as the number of "hits" by the longer wavelength $\lambda_2$ on the diffractive element H2, which is disposed on the lower surface 52 of the substrate 60. As shown, the number of exit points for light 82 ($\lambda_2$) and light 84 ($\lambda_1$) is substantially the same. Consequently, the color uniformity of the output light 80 diffracted out of the second diffractive element H2 is improved (see FIGS. 7–9). However, the diffraction efficiency generally is lower for the longer wavelength compared to shorter wavelength from the same grating. Therefore the interval lengths are not exactly the same in a well-balanced system. Longer wavelengths then have shorter interval lengths than short wavelengths.

In FIG. 3a, outgoing light 80 emerges from the lower surface 52 of the substrate 60, directly from the diffractive element H2. Similarly, outgoing light 90, which includes light 92 of the shorter wavelength $\lambda_1$ and light 94 of the longer wavelength $\lambda_2$, can emerge from the upper surface 32 of the substrate 60, as shown in FIG. 3b. In this case, the diffractive element H2 causes the reflected light rays 72, 74 to be diffracted upward, through the thin film 40 and refracted though the dense-rare interface 32.

FIGS. 3a and 3b show the schematic representation of the EPE wherein only two layers 30, 50 are used to provide reflective surfaces for two wavelengths $\lambda_1$ and $\lambda_2$ in order to improve the light distribution of two wavelengths. The same principle can be extended to the EPE for three or more wavelengths. As shown in FIG. 3c, the substrate 60 comprises three layers of optical material 36, 34 and 50 to provide three interfaces for reflection. For example, if incident light 70 is composed of light in red, green and blue colors, then three diffracted beams 72 (red), 76 (green) and 74 (blue) are trapped within the substrate 60. In that case, the TIR for blue light occurs at the air-substrate interface 32, the TIR for green occurs at the interface between layers 34 and 36, and the TIR for red occurs at the interface between layers 34 and 50.

Preferably, a thin film 40 is provided between the layer 34 and the layer 50, and a thin film 42 is provided between the layer 34 and the layer 36. The thin film 40 can be made of $AlF_3$, NaF, or cryolite to separate red light from green and blue light. However, the thin film 42 should have an even lower refractive index in order to separate green light from blue light. The thin film material having a refractive index of the order of 1.2 is disclosed in U.S. Pat. No. 5,882,773 (Chow et al.). With a correct relative thickness for each layer, the interval L1 between reflections for red can be made approximately equal to the interval L2 for green and the interval L3 for blue.

Figure 4:
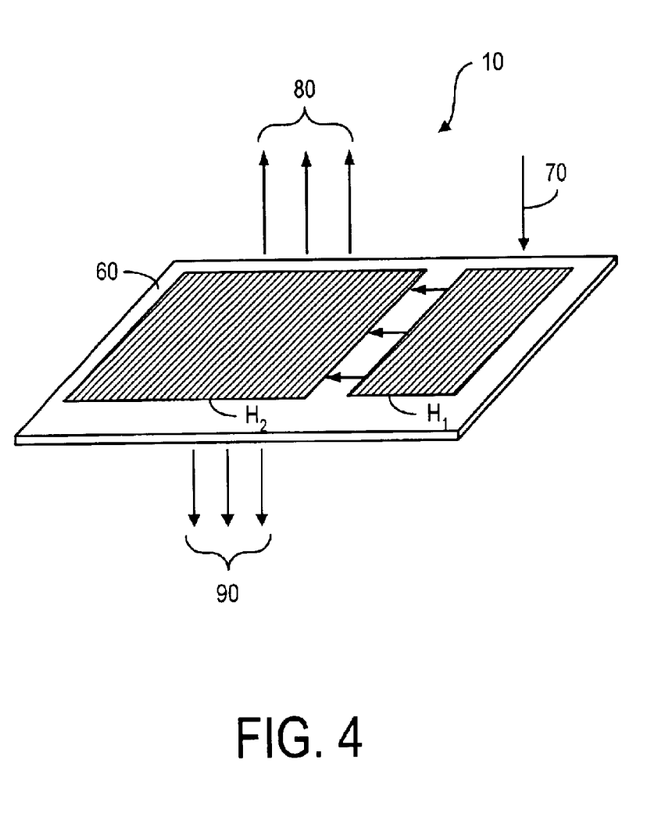
FIG. 4 is a schematic representation showing a different view of the exit pupil extender, according to the present invention.
Figure 5:
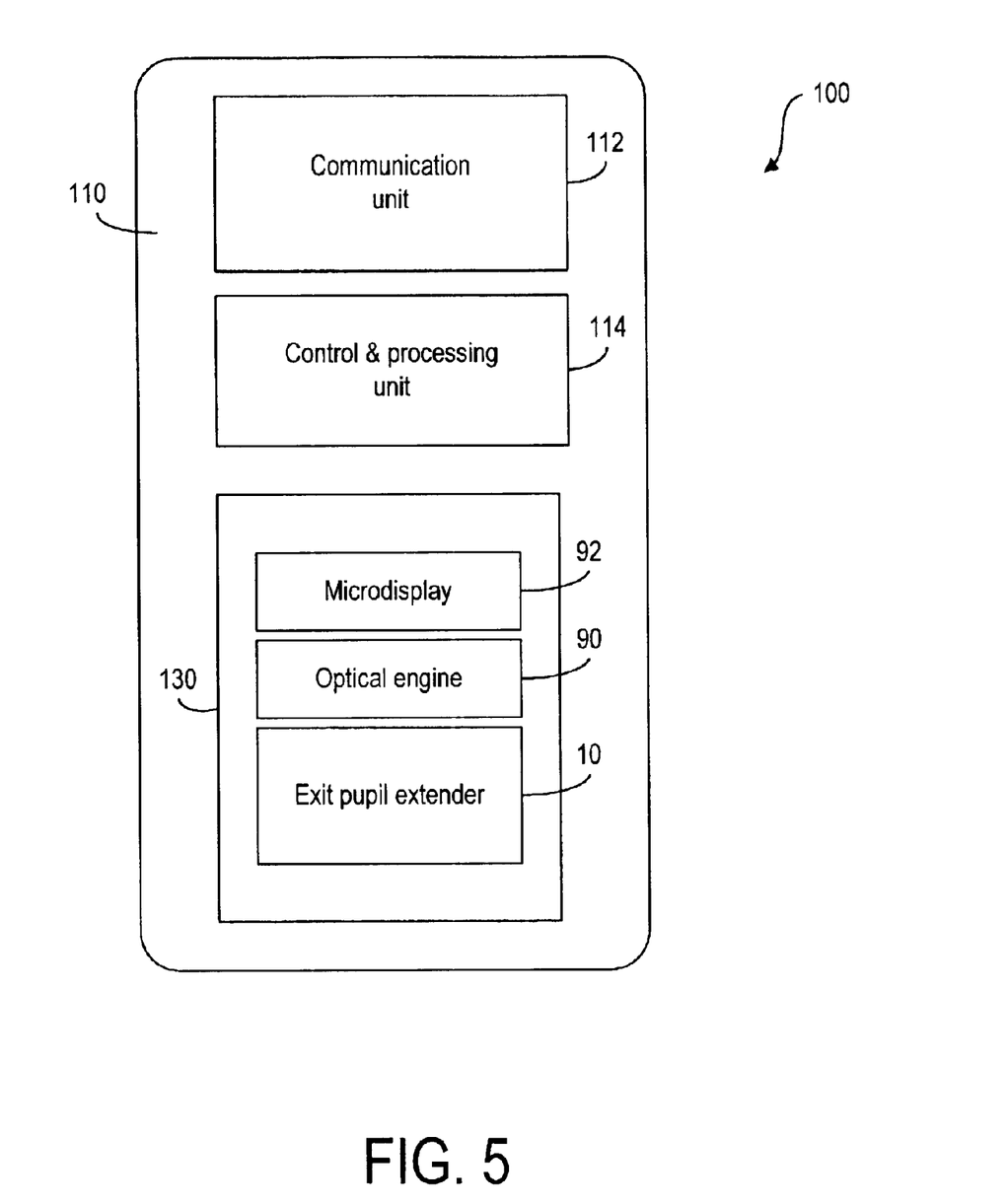
FIG. 5 is a schematic representation showing a mobile device having a virtual display system.

The EPE 10, according to the present invention, has two diffractive elements H1, H2 arranged adjacent to each other so that the light distribution is expanded in one direction by H2. An exemplary arrangement of the diffractive elements H1 and H2 is shown in FIG. 4. The EPE 10 can be used in a portable device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 5, the portable device 100 has a housing 110 toga house a communication unit 112 for receiving and transmitting information from and to an external device (not shown). The portable device 100 also has a controlling and processing unit 114 for handling the received and transmitted information, and a virtual display system 130 for viewing. The virtual display system 130 includes a microdisplay or image source 132 and an optical engine 134. The controlling and processing unit 114 is operatively connected to an optical engine 134 to provide image data to the image source 132 to display an image thereon. The EPE 10, according to the present invention, can be optically linked to an optical engine 134.

A simulation study on a binocular display has been carried out to illustrate the principle of selective reflection control in the EPE, according to the present invention. The plot shown in FIGS. 6 to 9 represent the intensity distribution as a function of distance η for three wavelengths: red, green and blue. The unit on the vertical axis is the number of photons and the unit on the horizontal axis is mm. The grating depth is chosen so that the blue wavelength is homogeneous over the entire viewing area.

Figure 6:
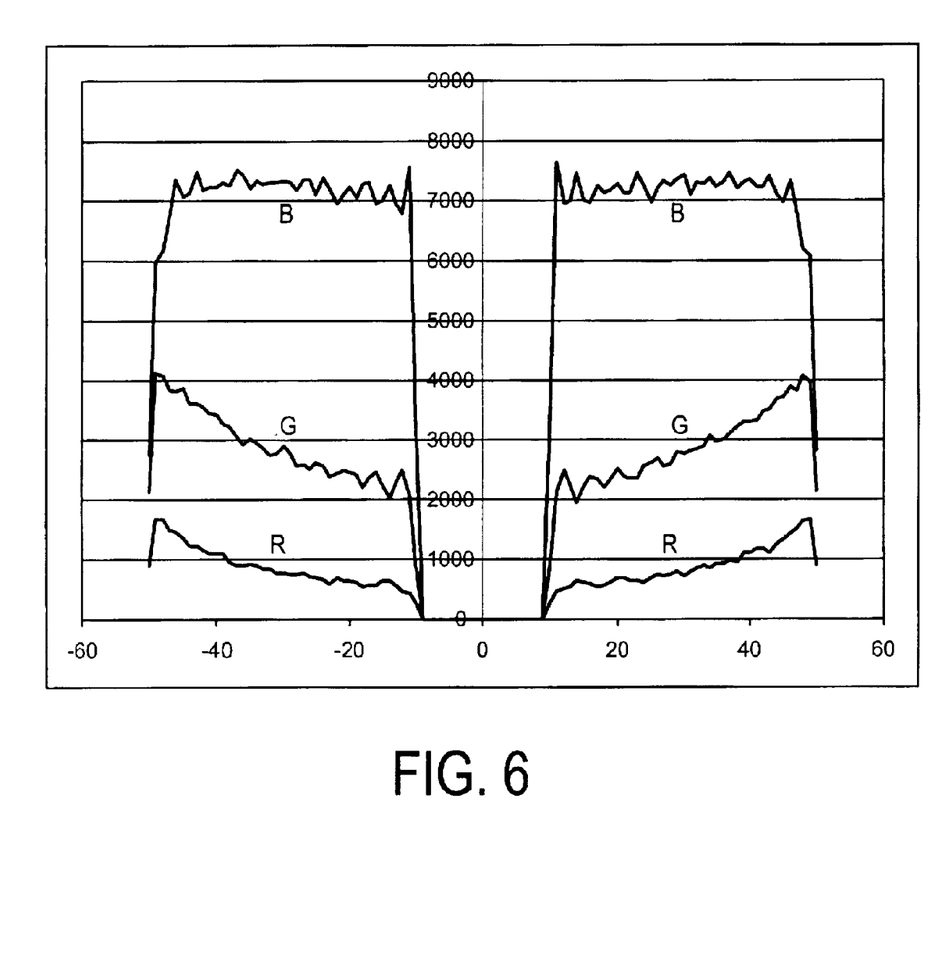
FIG. 6 is a plot showing the output light distribution over the exit pupils of a binocular virtual display of three colors in a prior art EPE.

In FIG. 6, the substrate is simply a flat plate of optical material similar to the substrate 6 of FIG. 2 where no thin films are used to separate the colors. Because of the differences in reflection interval L among the three colors, the green and red colors are not homogeneous over the viewing area.

Figure 7:
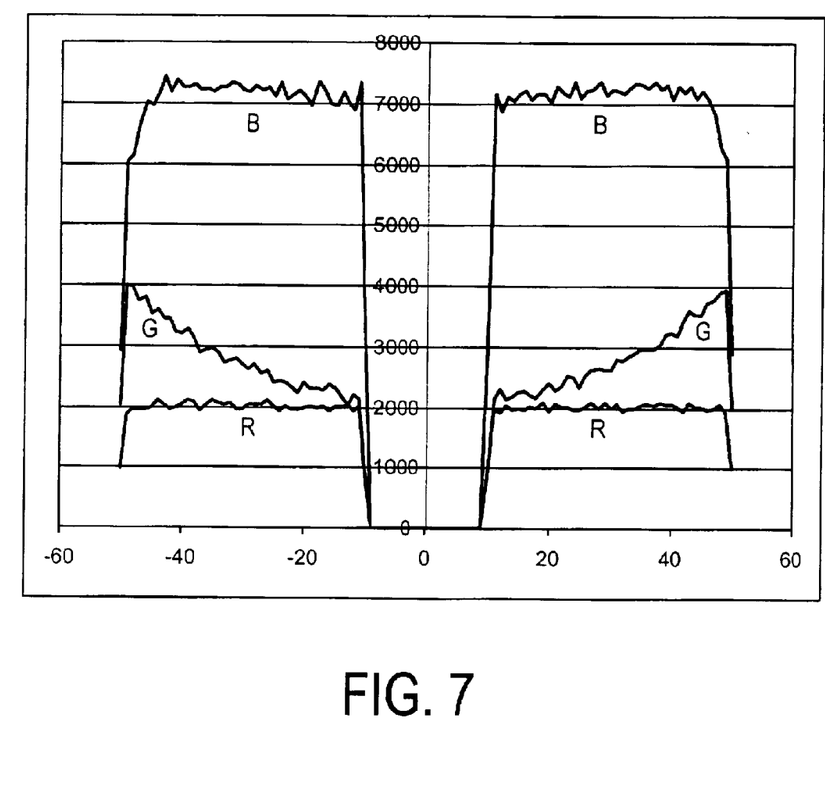
FIG. 7 is a plot showing the output light distribution over the exit pupils of a binocular virtual display of three colors in an EPE having one thin film to separate the red color from the other two colors.
Figure 8:
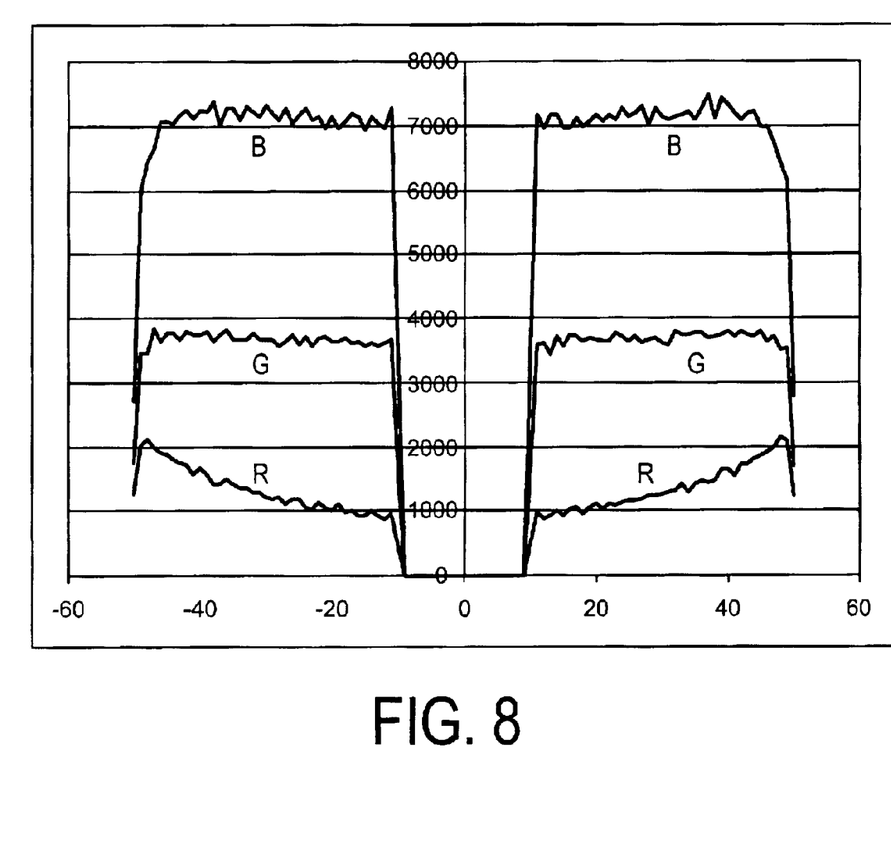
FIG. 8 is a plot showing the output light distribution over the exit pupils of a binocular virtual display of three colors in an EPE having one thin film to separate the blue color from the other two colors.

If one thin film is incorporated into the substrate to separate the red light from green and blue lights, as shown in FIGS. 3a and 3b, the red color can be made homogeneous over the viewing area. However, because the reflection interval for green light is not changed, the output light distribution of green color is not homogeneous over the viewing area, as shown in FIG. 7. If one thin film is used to separate the green and red colors from the blue, then the green color is homogeneous over the viewing area while the red is not, as shown in FIG. 8.

Figure 9:
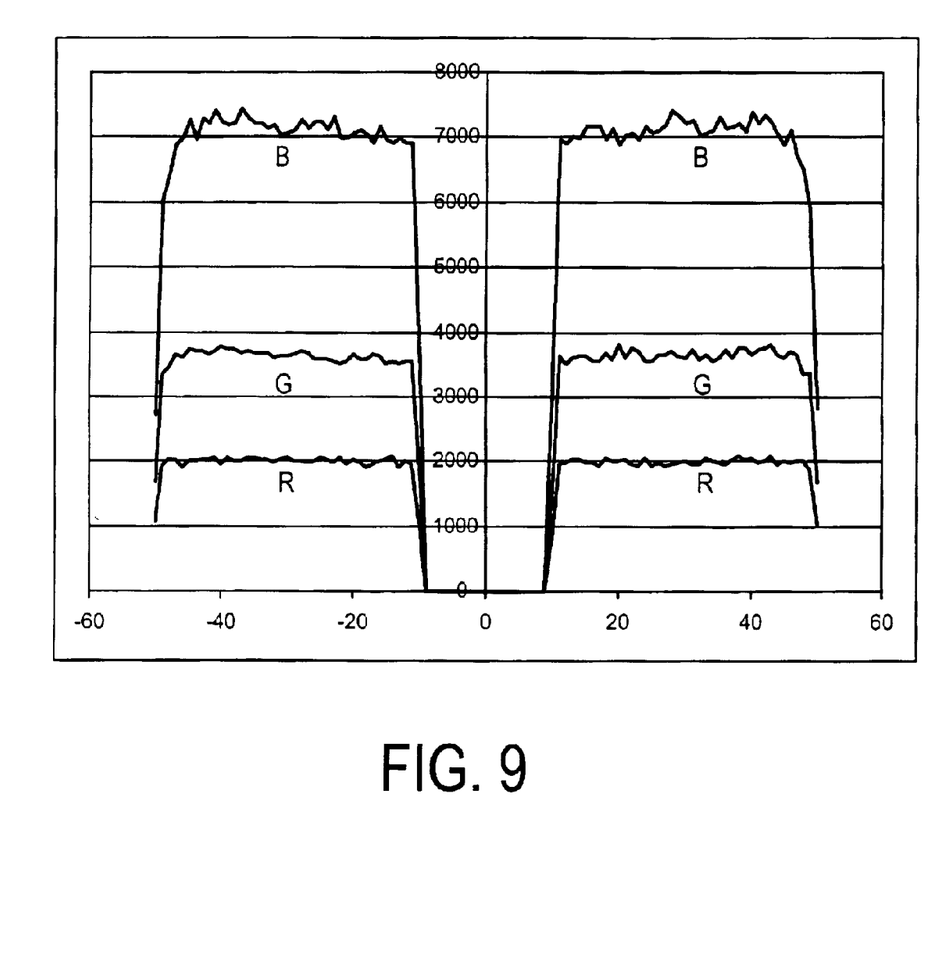
FIG. 9 is a plot showing the output light distribution over the exit pupils of a binocular virtual display of three colors in an EPE having two thin films to separate the three colors.

When two thin films, similar to those illustrated in FIG. 3c, are used to separately change the reflection intervals for red and green colors, all three colors are homogeneous over the viewing area, as shown in FIG. 9. In FIG. 3c, the thin film 40 separates the red color from the green and blue colors and the thin film 42 further separates the green from the blue.

It should be noted that each of the diffractive elements H1 and H2 could be a holographic diffractive element (HOE) or a diffractive optical clement (DOE). As the name suggests, a holographic diffraction element is holographically produced where at least two coherent light beams are used to produce interference fringes. In contrast, a diffraction optical element can be mechanically or chemically produced. The EPE 10 can have two or more diffractive elements.

The objective of the present invention is to achieve substantially uniform reflection intervals (L1, L2, L3) among different wavelengths, and thus it is also possible to use multi-layer coatings instead of the thin film 40 or 42 for selectively reflecting light of longer wavelengths. Moreover, the application for the EPE of the present invention is not limited to virtual displays. The selective reflection control in a planar waveguide (substrate 60), according to the present invention, can also be used in any application where optical beam expansion in one or more directions is required and light of different wavelengths is used. The diffractive elements (H1, H2) are, in fact, optical couplers and light modulator devices for coupling light into the planar waveguide. Thus, the EPE 10, as shown in FIGS. 3a–3c, can be viewed as an optical device comprised of a planar waveguide and a plurality of optical couplers (or light modulator devices) disposed adjacent to or on the waveguide for light coupling and manipulating purposes.

The image source 132, as depicted in FIG. 5, can be a sequential color LCOS (Liquid Crystal On Silicon) device, an OLED (Organic Light Emitting Diode) array, a MEMS (MicroElectro Mechanical System) device or any other suitable micro-display device operating in transmission, reflection or emission.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. An optical device (10) comprising:
    a substantially planar light-guiding member (60) having a first surface (32) and an opposing second surface (52), and
    a light coupling structure (H1) positioned relative to the light-guiding member for coupling light waves (70) into the light-guiding member, the light-guiding member guiding the light waves (72, 74) within the light-guiding member based substantially on successive internal reflections as the light waves travel between the first and second surfaces, the light waves comprising at least first light waves of a first color ($\lambda_1$) and second light waves of a second different color ($\lambda_2$), wherein the first light waves are internally reflected at a first reflection angle ($\theta_{m1}$) and the second light waves are internally reflected at a second reflection angle ($\theta_{m2}$) greater than the first reflection angle in reference to a surface normal (N) of the second surface, said optical device characterized by at least one substantially planar interface (40) provided between the first surface and the second surface substantially parallel to the first surface to reflect the second light waves toward the second surface as the second light waves travel from the second surface toward the first surface, while allowing the first light waves to be transmitted through the planar interface.

2. The optical device of claim 1, wherein the successive internal reflections by the first light waves at the second surface occur at a plurality of first reflection points separated by a first reflection interval (L1), and the successive internal reflections by the second light waves at the second surface occur at a plurality of second reflection points separated by a second reflection interval (L2), said optical device further characterized in that the planar interface is positioned between the first and second surfaces such that the first reflection interval is substantially equal to the second reflection interval.

3. The optical device of claim 1, further characterized by a further light coupling structure (H2) positioned relative to the light-guiding member to cause the light waves encountering the second surface to be partially transmitted through the second surface and partially reflected toward the first surface.

4. The optical device of claim 1, further characterized by a further light coupling structure (H2) positioned relative to the light-guiding member to cause the light waves encountering the second surface to be partially transmitted through the planar interface (40) and then the first surface (32), and partially reflected from the second surface toward the first surface while maintaining the reflection angles.

5. The optical device of claim 1, characterized in that the light coupling structure (H1) comprises a diffractive element.

6. The optical device of claim 3, characterized in that the further light coupling structure (H2) comprises a diffractive element.

7. The optical device of claim 4, characterized in that the further light coupling structure (H2) comprises a diffractive element.

8. The optical device of claim 3, characterized in that the light coupling structure (H1) and the further light-coupling structure (H2) are holographic diffractive elements imparted on the light-guiding member.

9. The optical device of claim 1, wherein the light waves further comprise third light waves of a third color ($\lambda_3$) different from the first and second colors, wherein the third light waves are internally reflected at a third reflection angle ($\theta_{m3}$) smaller than the first and the second reflection angles, said optical device further characterized by a further planar interface (42) provided between the first surface (32) and the planar interface (40) so as to reflect the first light waves toward the second surface as the first light waves travel from the second surface toward the first surface, while allowing the third light waves to be transmitted through the further planar interface.

10. The optical device of claim 1, wherein the light-guiding member is made of an optical material having a first refractive index, said optical device further characterized in that the planar interface (40) is a layer made of an optical material having a second refractive index smaller than the first refractive index so that the reflections by the second light waves at the planar interface are total internal reflections.

11. The optical device of claim 9, wherein the light-guiding member is made of an optical material having a first refractive index, said optical device further characterized in that the further planar interface (42) is a layer made of an optical material having a second refractive index smaller than the first refractive index so that the reflections by the first light waves at the further planar interface are total internal reflections.

12. A method of improving color uniformity in an optical device (10), the optical device comprising:

a substantially planar light-guiding member (60) having a first surface (32) and an opposing second surface (52), and a light coupling structure (H1) positioned relative to the light-guiding member for coupling light waves (70) into the light-guiding member, the light-guiding member guiding the light waves (72, 74) within the light-guiding member based substantially on successive internal reflections as the light waves travel between the first and second surfaces, the light waves comprising at least first light waves of a first color ($\lambda_1$) and second light waves of a second different color ($\lambda_2$), wherein the first light waves are internally reflected at a first reflection angle ($\theta_{m1}$) and the second light waves are internally reflected at a second reflection angle ($\theta_{m2}$) greater than the first reflection angle in reference to a surface normal (N) of the second surface, said method characterized by providing at least one substantially planar interface (40) between the first surface and the second surface substantially parallel to the first surface to reflect the second light waves toward the second surface as the second light waves travel from the second surface toward the first surface, while allowing the first light waves to be transmitted through the planar interface.

13. The method of claim 12, wherein the successive internal reflections by the first light waves at the second surface occur at a plurality of first reflection points separated by a first reflection interval (L1), and the successive internal reflections by the second light waves at the second surface occur at a plurality of second reflection points separated by a second reflection interval (L2), said method further characterized in that the planar interface is provided at a position between the first and second surfaces such that the first reflection interval is substantially equal to the second reflection interval.

* * * * *